United States Patent

[11] 3,590,226

| [72] | Inventor | Claude A. Lane<br>Los Angeles, Calif. |
|------|----------|----------------------------------------|
| [21] | Appl. No. | 735,754 |
| [22] | Filed | June 10, 1968 |
| [45] | Patented | June 29, 1971 |
| [73] | Assignee | Hughes Aircraft Company<br>Culver City, Calif. |

[54] MACHINE TOOL CONTROL SYSTEM
28 Claims, 10 Drawing Figs.

[52] U.S. Cl. .................................................. 235/151.11,
235/150.3, 318/571, 235/152
[51] Int. Cl. ....................................................... G06f 15/46
[50] Field of Search ........................................... 235/151.11,
150.3, 150.31, 152; 318/20.110

[56] References Cited
UNITED STATES PATENTS

| 3,137,787 | 6/1964 | Spencer, et al. | 235/150.31 X |
| 3,148,273 | 8/1964 | Truitt, et al. | 235/152 |
| 3,372,268 | 3/1968 | Hoernes | 235/151.11 |
| 3,417,303 | 12/1968 | Reuteler | 318/18 X |

Primary Examiner—Eugene G. Botz
Assistant Examiner—Charles E. Atkinson
Attorneys—James K. Haskell and Earnest F. Oberheim ABSTRACT: A contour cutting machine tool electrical control system is described which includes a digital integrator having a counting circuit coupled to register the value of the feed rate number and including logic circuitry responsive to the counting circuit for adjusting the value of the output of the accumulator register inversely proportional to the value of the feed rate number.

LOGIC GATES -55-

LOGIC GATE 87.

FIG. 10

MACHINE TOOL CONTROL SYSTEM

BACKGROUND OF THE INVENTION

This invention relates to digital integrators for performing mathematical computations and more particularly to a novel and improved integrator which includes the capability of changing the length of the registers used therewith.

In machine tool control operation, the contouring functions performed thereby use numerical control computing devices employing digital integrators to perform interpolation functions. These computing devices include a number of integrators which are interconnected to produce the contouring functions in the form of electrical pulses being applied to axis drives.

A basic digital integrator of the prior art may be considered to consist of two storage registers which are usually shift registers wherein a digital word in the form of a plurality of binary bits is shifted in and out on clock pulse commands. These registers are usually termed an accumulator register and an integrand register. The integrand register serves to register the value of the dependent quantity which is in the form of a digital word supplied thereto by some other source, usually a buffer register. An independent variable word is usually incrementally added to the dependent variable to form the integration function.

In the operation of the integrator, a discrete variation in the independent quantity will cause the contents of integrand register to be added into the accumulator register. Repeated variations in the independent quantity may cause the quantity in accumulator register to periodically reach a predetermined value, at which time an overflow of the accumulator register occurs and an output signal will be produced. With each such output signal produced, a uniform digital increment in the output quantity is indicated. Subsequently, this output quantity may be used to position the machine tool through appropriate servomotors and the like.

In a graphic representation which may be used to illustrate this concept, the dependent variable in the integrand register is plotted as an ordinate axis, and the independent variable of the function is plotted as an abscissa axis. The output quantities are considered as units of area under the graph of the function, and thus the accumulation of these overflows result in an integration of the function. In the operation of the system of this type, the accumulator register often contains a numerical value after a cycle of computation.

The information provided for the integrand register and as the independent quantity for the computing integrators used with this system may be that provided for a numerical control of machine tools which automatically performs machine functions with generation of commands to the various machine axes. A typical machine may have two degrees of slide freedom in the rectilinear coordinant system for longitudinal and traverse motions. A workpiece is mounted on the slide and translated beneath the cutting tool in these axes. A third degree of freedom can be implemented by controlling the position of the cutting tool above and perpendicular to the plane of the slide. The tool position will cause it to penetrate the workpiece to a programmed depth and to cut a contour as a slide moves the workpiece in the proximity of the cutting tool. Each machine axis may have a self-contained servo drive to permit it to be displaced with respect to the other axis. Each axis servo is capable of accepting command functions independent of other machine axis servos.

The information which is supplied to the accumulator register and as the independent quantity, may be data supplied thereto from the numerical control tape storage system where it is first temporarily stored in a buffer register. If the word length of the dependent variable in the form of binary pulses supplied to the integrand register from the buffer register is of a predetermined minimum value and when added to the independent variable in the form of binary pulses accumulated in the accumulator register, the overflow thereof will provide the interpolated command signal to cause movement of the machine in a predetermined direction in incremental and finite steps alternately in the X and Y axes to form contours either circular or linear on the workpiece.

A problem occurs if the binary word in the integrand register is of such a small value that an exceedingly large number of additions must occur before each overflow thereof. In order to provide the overflow pulses at a sufficiently fast rate to enable the machine tool to cut at a proper speed, additions must be performed at an excessively high speed.

Heretofore, prior art systems shifted each number in its associated integrand register to reduce the number of additions per overflow and these had to be remembered in a separate storage so that the number of pulses could be corrected in subsequent operations and also so that integrand increments must also be shifted a corresponding amount before being added to or subtracted from the integrand register.

Therefore, it would be desirable if there could be provided a scaler which could modify the number capacity of the accumulator shift register proportional to the length of the word in the integrand register. By modifying the word capacity is meant that the number of significant digits in the binary words is changed, for example.

SUMMARY OF THE INVENTION

Briefly described, the present invention provides an improvement in an electrical digital integrator useful with machine tool control systems for cutting contours, as an example. The integrators used in this system include an integrand register, an accumulator register and an adder intercoupled to form the digital integrator. A storage register is provided which records the value of the input pulses forming the feed rate number which is determined by the velocity and distance which the machine tool, either the cutting tool or the workpiece, shall move. Logic circuitry is included which is responsive to the contents of the digital counter and the feed rate number and readjusts the value of digital pulses which are supplied to the adder by adjustment of the binary point of that number and inversely proportional to the value of the feed rate number.

It therefore becomes one object of this invention to provide such a novel and improved machine tool control system.

Another object of this invention is to provide a novel and improved digital integrator used with machine tool control systems which has adjustability on the value of the words used therein without resorting to the use of a shifted or scaled number.

Another object of this invention is to provide a novel and improved digital integrator useful in generating contour functions in a numerical controlled machine tool.

Another object of this invention is to provide a novel and improved digital integrator which includes apparatus for substantially changing the word value from the accumulator register with relation to the value of the word entered into the integrand register.

Another object of this invention is to provide a novel and improved digital integrator which includes means for changing the word value from the accumulator register inversely proportional to the feed rate number of a machine tool velocity.

Another object of this invention is to provide a novel and improved digital integrator which includes means for adjustment of the binary point in the output word of the accumulator register used therewith.

DESCRIPTION OF THE FIGURES

These and other objects, features and advantages will become more apparent to those skilled in the art when taken into consideration with the following detailed description wherein like reference numerals indicate like or corresponding parts throughout the several views wherein.

DESCRIPTION OF ONE PREFERRED EMBODIMENT OF THIS INVENTION

The present invention employs the use in its description of well-known logic circuit elements for implementation of the preferred embodiment which will hereinafter be described. The familiar AND/OR logic circuit gates and flip-flop circuits are used to explain the preferred embodiment of this invention. Such AND/OR gates and flip-flop circuits are well known to those skilled in the art and are adequately explained in the test "Digital Computer Fundamentals," 2d Edition, authored by Thomas C. Bartee, published by McGraw-Hill. It should be understood that other types of circuitry can be used in this embodiment without departing from the spirit and scope of this invention.

The present invention employs the use, for this preferred embodiment, of the familiar JK flip-flop. As is well known to those skilled in the art, the JK flip-flop is a bistable multivibrator circuit which has two output circuits, each of which has an output signal on one output circuit which is opposite to or the complement of the output signal on the other output circuit. The flip-flop is capable of changing state from a positive state hereinafter referred to as a "true" state or a negative state hereinafter referred to as a "false" state, or false to true, on its output terminals if a positive pulse is applied to both of its J and K inputs simultaneously. If a positive input pulse is applied to the J input terminal of a flip-flop previously set false, the flip-flop will change to a true state, but if the flip-flop is true when the J input is enabled, the flip-flop will not change states. On the other hand, should the flip-flop be true and a positive pulse is applied to its K input, it will change to a false state. If the flip-flop is already in the false state and a K input is enabled, the flip-flop will not change. Also, it should be understood that JK flip-flops operate when a clock pulse is present. Therefore, unless otherwise stated, when an input pulse is applied to either the J or K input terminals of the flip-flop, it will be considered to change state only when a clock pulse is applied to its clock input. Too, such JK flip-flops have a CLEAR (CL) input thereto and for particular purposes will not be resettable until a CLEAR pulse is applied thereto.

A number of logic terms are used herein which denote various high or low voltage pulses and will be denoted and referred to in the well-known Boolean algebra techniques as described in the aforesaid Bartee Publication. It should be understood that a term as hereinafter used refers to electrical pulses.

The following are the terms hereinafter used in describing the preferred embodiments and their definitions:

TERM DEFINITIONS

F2 = Interpolate $\overline{F2}$ = Transfer

F61—F63 = Feed rate most significant digit marker register which designates overflow bit in feed rate generator.

F65—F67 = Preset scaling counter which designates binary point in X, Y and Z integrators.

F69 = Feed rate and Z axis multiplier control to synchronize output from variable frequency voltage controlled oscillator set F69 to 1, lack of overflow from feed rate integrator or end of even word times set F69 to 0.

Figure 3:
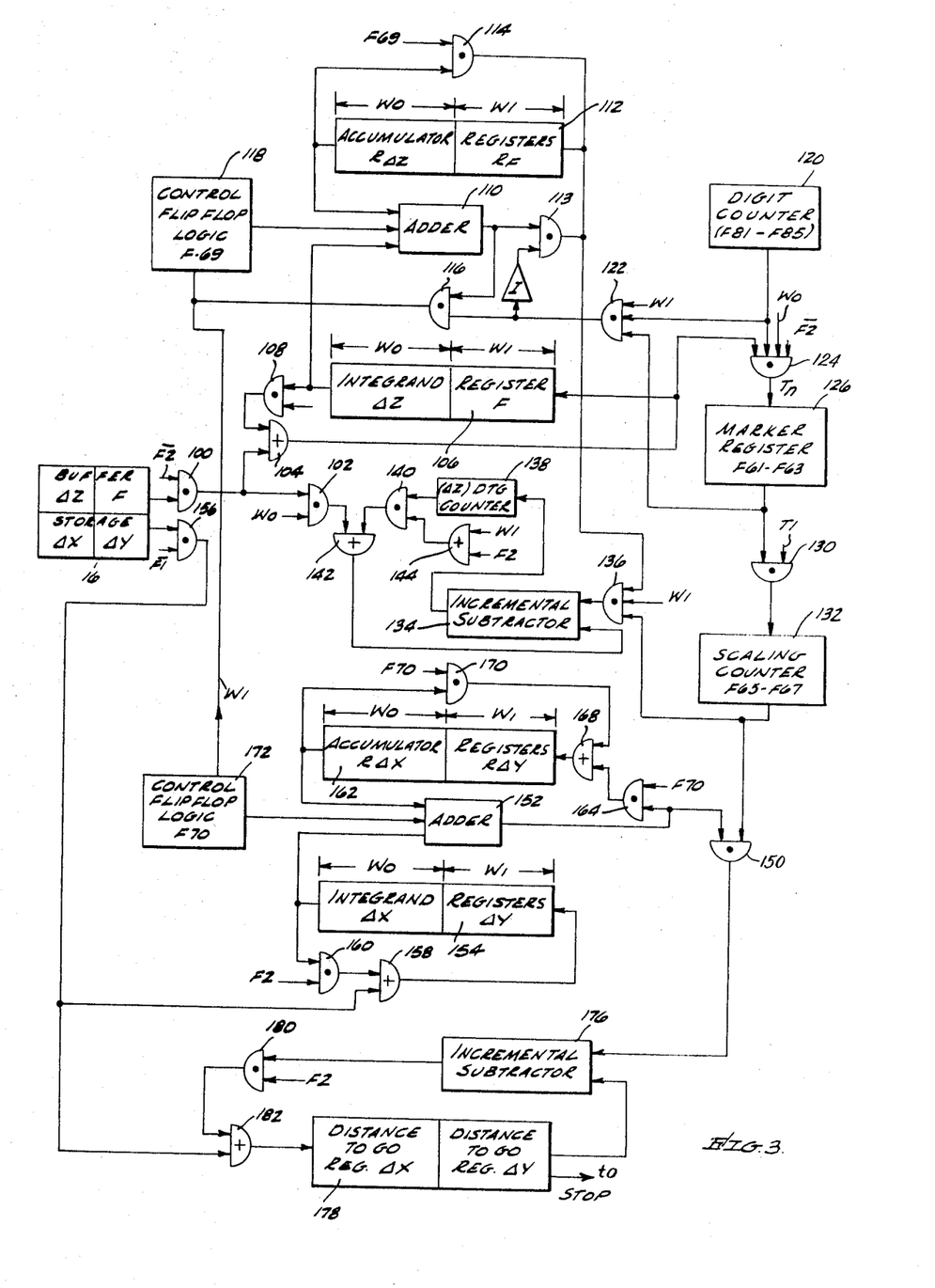
FIG. 3 is a schematic block diagram of interpolators capable of having registers holding a plurality of data words and including the principles of this invention.

F70 = Multiplier control for additional adders required for multiple axis when using additional shift registers and adder as shown in FIG. 3 in order to compute increments along more than one axis in parallel.

F80 = Overflow incremental storage flip-flop which delays overflow until it can be sent to table and appropriate countdown register.

F81—F85 = Digit counter

W0 = Even word times (17 bits)

W1 = Odd word times

Dn = nth digit times of any word

Tn = Time feed rate marker bit appears at output of adder.

T1 = Time feed number marker is made to preset counter.

T(2—n) = Time preset counter specifies overflow marker.

Binary Point 01 = Overflow point in the overflow number of the adder.

Binary Point 02 = Overflow point in the overflow number of the adder.

With reference to the f word used hereinafter, it should be noticed that this word is the feed rate number hereinafter referred to as FRN. As hereinafter used, a word pertains to a number of electrical pulses coded in a binary manner to form a digital number. Although not to be considered as limiting the scope of this invention, standards have been set in the machine tool industry that the f word should always conform to:

$$FRN = 10(v/D)$$

Where $v$ is the velocity of machine axis movement in inches per minute and D is the total desired distance of machine axis movement in inches, such a word may be the Z, X or Y interpolation word.

To derive a feed rate number (FRN) a clock pulse oscillator provides constant output pulses of 4 meg Hz. Each shift register, to be hereinafter described, has a length of 34 bits, which comprises two 17-bit words. Then the FRN is the oscillator frequency divided by the shift register value. The value of the word contained in the shift register can be changed by shifting of the binary point. This can be accomplished by the embodiment to be described by the change of the OVERFLOW time of the adder in the integrators depending upon the appearance of the binary point.

Figures 1, 4:
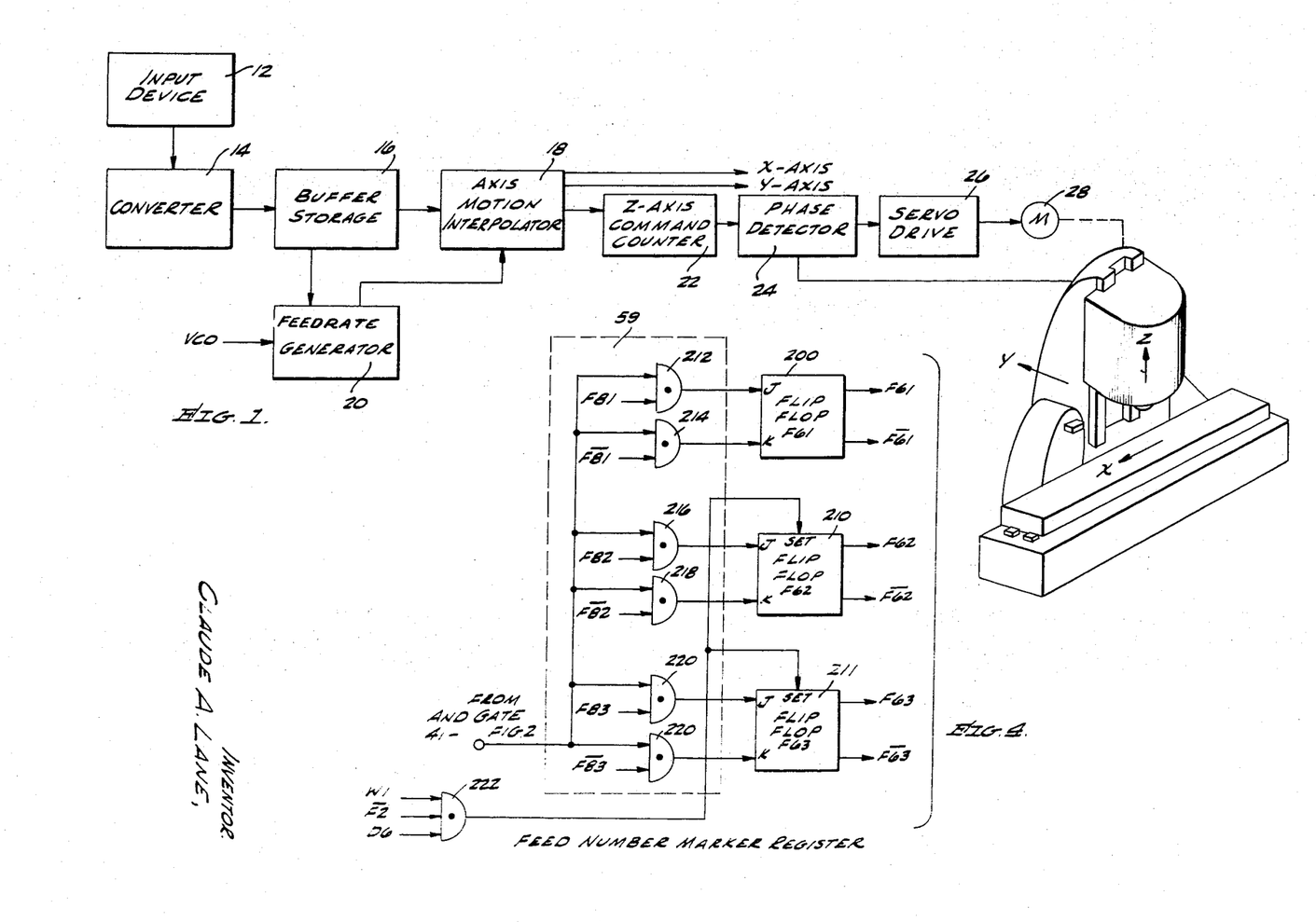
FIG. 1 is a block diagram of a machine tool control system embodying the principles of this invention.
FIG. 4 is the schematic logic diagram of the marker register used in the preferred embodiments of this invention.

Turning now to a more detailed description, there is shown in FIG. 1 a schematic drawing of electronic control system encompassing portions of this invention which uses the integrators hereinafter to be described. The system operates to move a profiling and contouring milling machine tool 10 in the X, Y and Z axes. An input device 12, which may be a punch paper tape or other type of program facility, provides initial move data electrical pulses in the form of binary words in binary coded decimal (BCD) to a tape input converter 14. The converter 14 converts the pulses BCD words to conventional binary words because the control system to be described operates in a binary fashion. It should be noted that a device could be built which operates straight binary from the memory and thus the need for the converter 14 could be eliminated but practical programming makes BCD more desirable. The output circuit of the converter 14 is coupled to an input circuit of a buffer storage 16 which temporarily stores the input data pulses until a transfer signal $\overline{F2}$ transfers the contents therein to an axis motion interpolator 18. Such transfer signals are supplied by the tape and is also a binary word. A feed rate generator 20 has an output circuit coupled to the input circuit of the interpolator 18 which provides the feed rate to the adder in the interpolator 18 and dictates the speed at which the interpolation takes place.

Each of the interpolated words X, Y and Z provided by the interpolators 18 is applied to input circuits of an axis command counter 22. For clarity, only one axis channel is shown but it should be understood that there are three identical channels, one for each axis. The counter 22 has an output circuit coupled to an input circuit of a phase detector 24. The phase detector 24 provides specific phase direction data to a servo driver 26 which has an output circuit coupled to a motor 28 which drives the machine tool 10 in its associated axis.

INTERPOLATOR WITH SINGLE WORD INTEGRATORS

Figure 2:
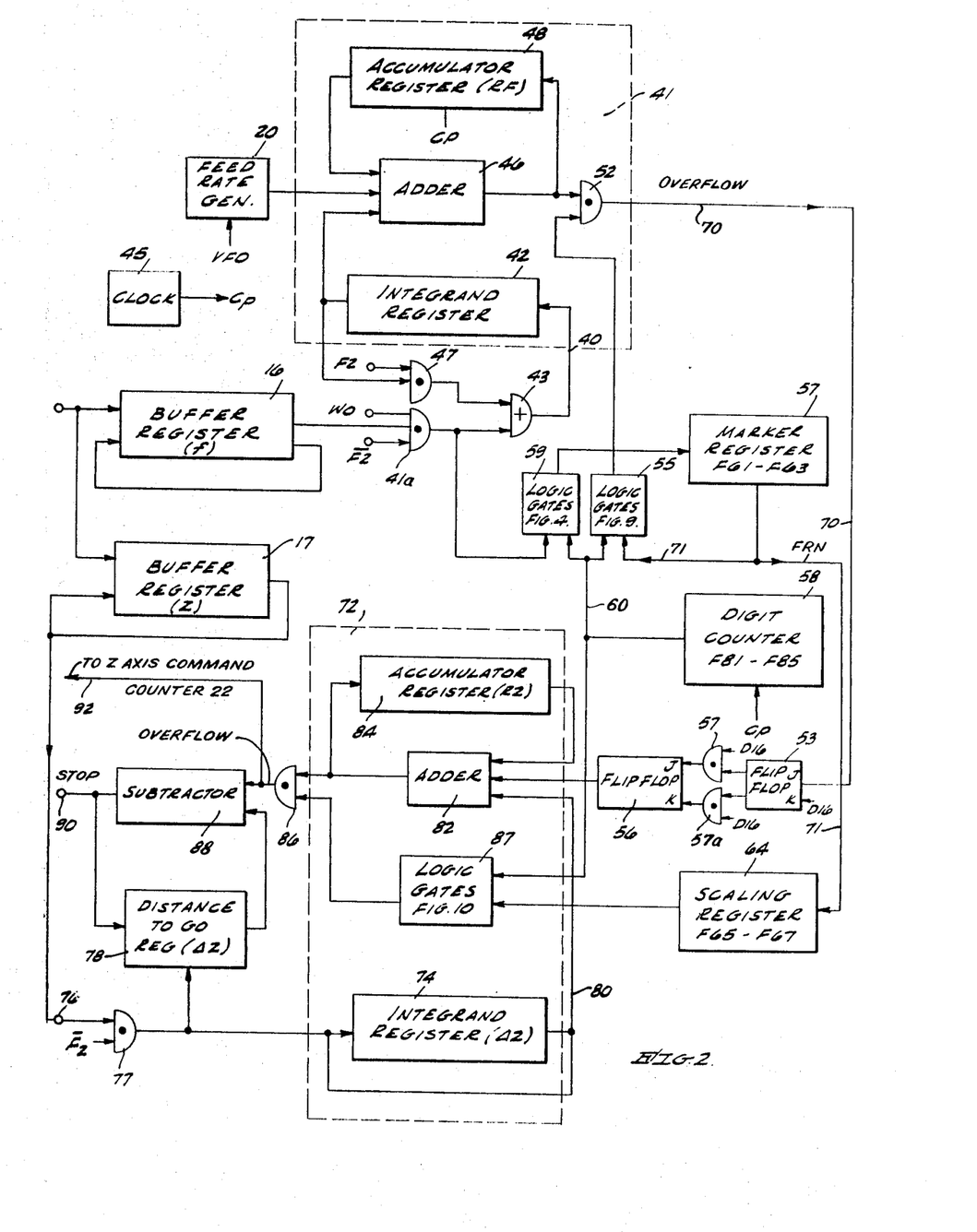
FIG. 2 is a block diagram of an interpolator for machine tool axis feed including the principles of this invention.

FIG. 2 illustrates a computing circuit which receives the $f$ word from the buffer register 16 and the interpolator words from the buffer register 17 into apparatus for interpolation in integrator 41, such as contained in interpolator 18 shown in FIG. 1. The $f$ word is shifted into an integrand register 42 through an AND gate 41a and an OR gate 43. AND gate 41a is also enabled by an $\overline{F2}$ pulse which indicates a transfer command as set forth in the above table, and a signal WO which indicates an even word time which in this example is the $f$ word. The integrand register 42 may be a shifting register which serially receives input pulses on the input circuit 40 of the integrator 41. The input signal from the buffer register 16 is shifted through the shift register 42 by clock pulses or signals $C_p$ applied thereto from a clock pulse generator 45. The OR gate 43 receives a second enabling pulse from an AND gate 47 which is enabled by the signal from the recirculation line 44 of the integrand register 42 and an F2 pulse which is the interpolator command signal. The integrand register 42 receives and holds the binary FRN or $f$ word of 17 bits, for example, and is a recirculating type shifting register wherein the word is continuously recirculated. At specific command times provided by the feed rate generator 20, the output pulses of integrand register 42 are incrementally applied to an adder 46 which has an input circuit coupled to the output circuit of the integrand register 42. Also coupled as an input to the adder 46 is the output circuit of an accumulator register 48.

Upon appropriate times provided by the feed rate generator 20 which receives variable frequency pulse VFO on its input as shown in FIG. 1, the contents of the integrand register 42 are incrementally added to the contents of accumulator register 48. The addition in adder 46 is made at the preselected times dictated by the feed rate generator 20 which is on for 34 bit times or two words, WO and W1.

Figure 3A:
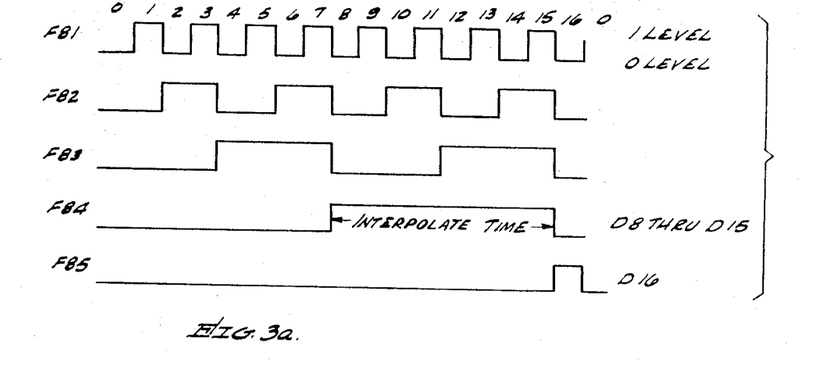
FIG. 3a is a timing diagram of the digit counter and binary point generator.

The output of adder 46 is coupled directly to one of the inputs of an AND gate 52. The output of AND gate 52 is coupled to the J input terminal of a flip-flop 53. The Q and $\overline{Q}$ outputs of flip-flop 53 are coupled to individual inputs of respective AND gates 57b and 57a. A signal D16 (See FIG. 3a) is coupled to the K input terminal of the flip-flop 53 and to the remaining inputs of the AND gates 57b and 57a. The outputs of the AND gates 57b and 57a are coupled to the J and K input terminals respectively of a flip-flop 56. Signal D16 is a word time signal so that flip-flop 56 comes on during a single word time. Also coupled as an enabling input to AND gate 52 is the output of the logic gate 55. A digit counter 58 provides an output on composite line 60 each time the most significant digit of that digit counter 58 is obtained. Digit counter 58 is a free running counter which is driven by pulses $C_p$ from the systems clock 45.

Logic gate 59 is enabled by composite line 60 and the output from AND gate 41a. When the AND gate 57a is enabled, the data in the form of the FRN is fed directly into a feed number marker register 57. The feed number marker register 57 has a composite output line 71 coupled as an input to the logic gate 55 and also coupled into a preset counter scaling register 64.

At predetermined times $\overline{F2}$, the feed rate number FRN is applied to logic gates 59 along with outputs of digit counter 58 to provide outputs to the marker register 57 to set the marker register to a predetermined number which indicates, for example, the rate of speed the associate work table will move. When the marker register 57 serially matches the contents of the digit counter 58, an overflow is provided on line 70 to the integrator 72. Similarly, the contents of the marker register 57 are shifted to a scaling register 64 on line 71, as described more fully in the discussion of FIG. 5, infra. The overflow passed by gate 52 is coupled to the flip-flop 53 by line 70 and thereby applied to adder 82 of integrator 72 through gates 57a, 57b and flip-flop 56.

Integrator 72 comprises an integrand register 74 which receives an input word from buffer 16 of FIG. 1 through buffer 17 and gated through an AND gate 77. As the input word from buffer 17 is applied to the integrand register 74, it is also applied to the distance-to-go register 78, as shown in FIGS. 1 and 3, which will be explained in more detail as this description proceeds.

Integrator 72 comprises an integrand register 74 which receives an input signal from buffer 17 which is the distance of movement on a selected word such as a Z-axis of FIG. 1 on line 76, which is gated thereto by AND gate 77 with an $\overline{F2}$ pulse. As the input word from buffer 17 is applied to the integrand register 74, it is also applied to the distance-to-go register 78, shown in FIGS. 1 and 3, which will be explained in more detail as this description proceeds.

Integrand register 74 has an output circuit 80 which is coupled as an input to an adder 82. Adder 82 has an output circuit which is coupled into the input circuit of an accumulator register 84 and also coupled to the input circuit of an AND gate 86. The output circuit of accumulator register 84 is coupled back to the input circuit into the adder 82. Integrand register 74, accumulator register 84 and adder 82 comprise the integrator 72 and operate in the same manner as the integrator 41. The only difference being that it receives its incremental enabling signals to the adder 82 from the flip-flop 56 which is a direct function of the output of integrator 41. The AND gate 86 is also enabled by the scaling register 64 which determines the overflow time from the adder 82. Scaling register 64 indicates when the overflow is to occur from the second integrator 72 from adder 82 by establishing the BINARY POINT 02 in the logic gate 87. The scaler 64 scales in the opposite direction of the marker register 57 as explained in more detail in connection with FIG. 5. The scaling in the opposite direction by the exact number of counts in digit counter 58 results in an inverse shift. Thus if the accumulator register 48 is shortened, then the accumulator 84 of the integrator 72 would need to be lengthened the same amount. Thus if one register is arbitrarily shortened, then the output would be at the same rate as that coming out of the adder 46. The output of gate 86 must therefore come out at a slower rate.

The output of AND gate 86 is coupled to a subtractor 88 which subtracts a digit from the binary word placed in the distance-to-go register 78 from the buffer register 17 until the register 78 reads 0, at which time an output signal is provided on the output circuit 90 to stop the interpolation process and machine axis movement. An output signal is also provided from AND gate 86 on lead 92 which is coupled to the axis command counter 22 as shown in FIG. 1.

INTERPOLATOR WITH MULTIPLE WORD INTEGRATORS

Referring now to FIG. 3, there is shown a 3-axis linear interpolator which uses multiple word integrators. The buffer storage register 16 is shown as being capable of holding four different digital command words, a $\Delta Z$ which indicates the Z action of movement to be interpolated, the $f$ word which indicates the feed rate number, a $\Delta X$ word for X movement, and a $\Delta Y$ word for the Y movement. The output of the buffer register 16 containing the $\Delta Z$ and the $f$ word is applied serially and incrementally to an AND gate 100 which receives a second enabling input $\overline{F2}$, a transfer signal as heretofore discussed and which indicates that no interpolation command is present. The output signal of AND gate 100 is applied to AND gate 102 and to one of the input circuits of an OR gate 104. AND gate 102 is also enabled by a WO which indicates that interpolation will be taking place on the first input word. The data word from buffer storage 16 is then entered into an integrand register 106 which comprises two 17 word bit registers denoted as WO and W1, and the bit stream therefrom is applied into the register 106 incrementally. It is recirculated therein through AND gate 108 which is enabled by an $\overline{F2}$ which indicates that as long as there is no interpolate command, the word in the integrand register 106 will continue to recirculate.

The output of integrand register 106 is also applied into the adder 110 and the output thereof is coupled through AND gate 113 into the input of accumulator registers 112, which also comprises two 17 bit word registers denoted as W0 and W1, and the words will continue to circulate through AND gate 114 which is enabled by a pulse denoted as F69 which will be explained in more detail as the description progresses.

The output of adder 110 is coupled through AND gate 116 to control logic 118 which provides the F69 pulse previously mentioned, where F69 indicates a feed rate and acts as the multiplier control to synchronize outputs from a variable frequency oscillator control and is set to 1, and when there is no overflow from feed rate integrator through AND gate 116 or an even word term, as will be explained, the F69 pulse from control flip-flop logic 118 is set to 0. Thus adder 110 provides serial incrementation from the integrand register 106 and accumulator register 112 on each command signal from the control flip-flop logic 118.

A digit counter 120 provides output increments on a bit-by-bit basis which corresponds to the word timing of the buffer storage 16 and is comprised of a plurality of flip-flops denoted F81—F85 and provides the pulses F81—F85 in relation thereto. The output circuit of digit counter 120 is coupled into an AND gate 122 and also into an AND gate 124. The AND gate 124 provides an output denoted as $T_n$ which indicates the time a feed rate marker bit appears at the output of adder 110 and is also enabled by a W0 and a W1, and an output from OR gate 104 indicating that if on a transfer time $\overline{F2}$ an AND gate 124 will be enabled.

The output circuit of AND gate 124 is coupled into a feed number marker register 126 which is similar to the feed number marker register 57 shown in FIG. 2. The output of register 126 is coupled into AND gate 122 as an enabling input to further provide for control of control flip-flop logic F69. The output of register 126 is also coupled into an AND gate 130 which is enabled by a T1, where T1 is a time feed number marker which is applied to a scaling counter 132.

The scaling counter 132 is described in more detail with reference to FIG. 5 and provides output signals to control inputs to an incremental subtractor 134 through an AND gate 136. AND gate 136 is also enabled by a W1 which indicates that an odd word time from the buffer register 16 is provided, and is also enabled by an output signal of AND gate 113 which indicates overflow pulses are provided from the integrator thereof. The output circuit of the incremental subtractor 134 is coupled into the distance-to-go counter 138 and is coupled back into the incremental subtractor as providing the other subtraction factor thereof through AND gate 140 and OR gate 142, where AND gate 140 is enabled by an OR gate 144 which has an input W1 or F2, which indicates that either a W1, an odd word time, or an F2, an interpolate signal, is provided. OR gate 142 is enabled by the output pulse of AND gate 140 or the output pulse of AND gate 102, and indicates that overflow pulses will either increment the subtractor 134 or provide a fill thereto from the buffer register 16.

The output circuit of scaling counter 132 provides an overflow marker pulse to an AND gate 150. The AND gate 150 is enabled by another pulse provided by an adder 152 of a second integrator which uses multiple registers.

The second integrator includes an integrand register 154 which receives data from the ΔY word of the register of the buffer storage 16 through an AND gate 156 which is enabled also by an F1 term which indicates that a transfer has taken place and no interpolation is being performed. The output circuit of AND gate 156 is coupled into an OR gate 158 which is in the recirculation line of the integrand register 154.

The other input circuit to OR gate 158 is from the output circuit of an AND gate 160 which is also enabled by an $\overline{F2}$ term which indicates that no interpolation is taking place. When an interpolation is present, an F2 is present and 160 is disabled and the output of integrand register 154 is serially added incrementally in the adder 152 with the output of the contents of an accumulator register 162.

The integrand register and the accumulator register 154 and 162 are capable of holding at least two words each, one of which is the ΔX, the other of which may be the ΔY for providing that the movement of the machine tool on its X and Y axis is controlled by this interpolator, with the first circulated word added into the accumulator register 162 as provided through AND gate 164, which is enabled by an F70 pulse. The F70 pulse from the multiplier control (FIG. 1) to compute increments along more than one axis in parallel is present, and is provided by an F70 flip-flop which will be explained in more detail in connection with FIG. 8. The output circuit of AND gate 164 is coupled to an OR gate 168, which has for its other input circuit the output circuit of an AND gate 170, is also enabled by an F70 term. Thus during $\overline{F70}$ time, recirculation stops and incremental addition takes place in adder 152.

Adder 152 is incremented by the output pulse of control flip-flop logic 172 which is enabled by digit counter 120 through AND gate 122 and AND gate 116. When overflow pulse appears on the output circuit of adder 110, adder 152 and AND gate 122 are enabled by the feed marker register 126. The digit counter control flip-flop logic 172 assists in incrementing the adder 152. Outputs of adder 152 are provided through the AND gate 150 which has been enabled by the counter 132 which provides incremental signals to the incremental subtractor 176. The incremental subtractor 172 operates the distance-to-go counting registers 178 as similar to the operation of distance-to-go counter 138, and is coupled thereto to the AND gate 180 which is enabled by an F2 signal which indicates that interpolation functions are being provided. The pulse provided to decrement the distance-to-go counter 178 is provided through the OR gate 182 which is also enabled by an output pulse of AND gate 180. The digital word provided to the distance-to-go counter 182 is provided by the output of AND gate 156 which places the ΔX and ΔY into appropriate registers and is incrementally counted down. When the register 178 reaches 0, an output signal is provided which indicates a stop function to the machine tool being controlled thereby the outputs to X, Y and Z axes and counters driving the respective servos for X, Y and Z axes movement.

Digit counters 58, as shown in FIG. 2, and 120, as shown in FIG. 3, may comprise a plurality of flip-flops F81—F85 (not shown) interconnected in a well-known manner. Counter 58 (120) provides a plurality of output pulses denoted F81—F85 and their complements to represent binary numbers as set forth in FIG. 32.

FEED NUMBER MARKER REGISTER

With reference now to FIG. 4, there is shown a schematic block diagram of the feed number marker register used in FIG. 2 denoted as 57 and in FIG. 3 denoted as 126, which comprises three flip-flops 200, 210 and 211. These flip-flops provide the pulses termed F61—F63 respectively and are enabled by output logic gates 59 which in turn is enabled by pulses F81—F83 from the digit counter 120 of FIG. 3 or digit counter 58 of FIG. 2, and the output of gate 412 of FIG. 2. The specification will refer to the digit counter 120 for this embodiment.

Flip-flop 200 has its J input circuit coupled to the output circuit of AND gate 212 which is enabled by an F81 pulse on one of its input circuits and the output pulse provided on the output circuit of an AND gate 412. As the various words placed into digit counter 120 change to reflect the feed rate number (FRN), the marker register changes accordingly. The AND gate 212 is also enabled by an F81 pulse from the digit counter 120 which indicates that the least significant digit thereof is true.

The K input to flip-flop 200 is enabled by an $\overline{F81}$ from digit counter 120 and the output of AND gate 41a. Flip-flop 210 has its J input enabled by the output pulse of AND gate 216 which is enabled by the output pulse of AND gate 41a and an F82 pulse. The K input of flip-flop 210 is enabled by the output pulse of AND gate 218 which is enabled by the output pulse of AND gate 41a and $\overline{F82}$ pulse. Flip-flop 211 has its J input enabled by the output pulse of AND gate 220 which is enabled by the output pulse of AND gate 41a and an F83 pulse. The K input of flip-flop 210 is enabled by the output pulse of AND gate 220 which is enabled in turn by the output pulse of AND gate 212 and an $\overline{F83}$ pulse. Each of the flip-flops 200, 210 and 211 have a set input provided thereto by the output of an AND gate 222. AND gate 222 is enabled by W1 pulse in the case of the embodiment shown in FIG. 2 indicating that an odd word time is present, an $\overline{F2}$ pulse indicating that transfer is taking place, and the interpolator is not interpolating, and a D6 which indicates the value of the word in the digit counter is at least 6 bits long.

Thus the purpose of feed number marker register 57 and 126 is to indicate the most significant bit in the feed rate integrand register in order to specify the overflow bit in the associated accumulators and also to indicate the amount to modify the X, Y and Z integrator word lengths.

SCALING REGISTER

Figure 5:
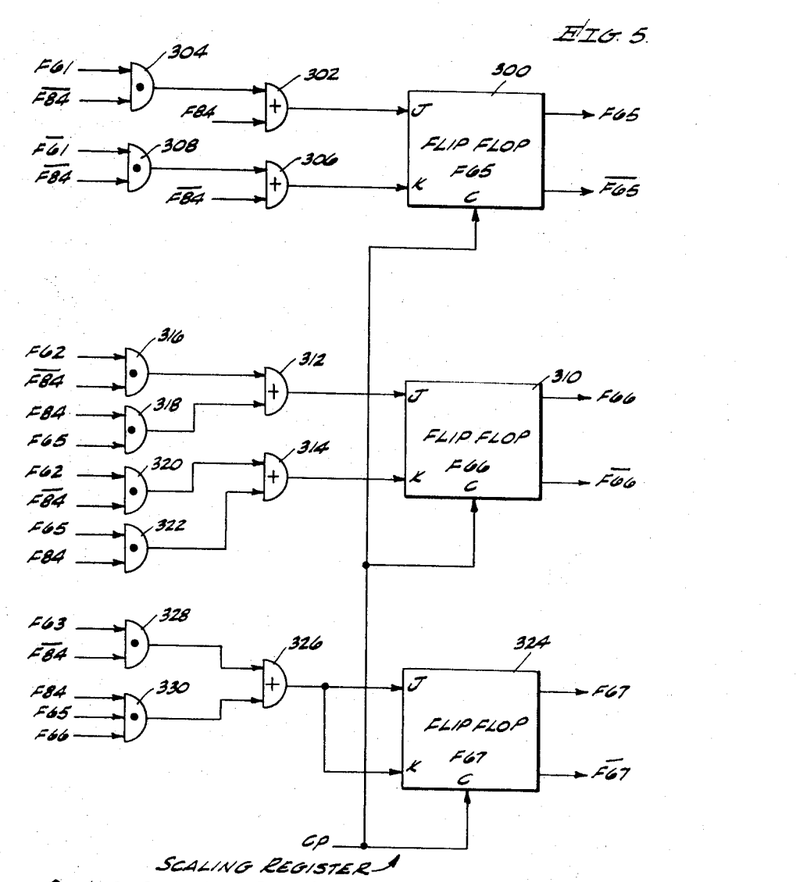
FIGS. 5—10 are illustrations of the logic block diagrams of other components used with the interpolator of FIG. 2.

Referring now to FIG. 5, there is shown the logic block diagram of the preset counter scaling register 64 as shown in FIG. 1, and 132 as shown in FIG. 3. Preset counting scaler comprises F65 flip-flop 300 which provides a pair of output pulses termed F65 and $\overline{F65}$, and has its J input enabled by the output of an OR gate 302. OR gate 302 is enabled by an F84 pulse from counter 58 and the output of AND gate 304. AND gate 304 is enabled by an F61 pulse from feed number marker register 57 and an $\overline{F84}$.

The K input to flip-flop 300 is enabled by the output of the OR gate 306 which in turn is enabled by an $\overline{F84}$ and the output of AND gate 308. AND gate 308 is enabled by an $\overline{F61}$ pulse and an $\overline{F84}$ pulse. Flip-flop 310 provides a pair of outputs F66 and $\overline{F66}$ and has its J input enabled by the output of OR gate 312 and its K input enabled by the output of OR gate 314. OR gate 312 is enabled by the output of AND gate 316, where AND gate 316 is enabled by an F62 pulse and an $\overline{F84}$ pulse. OR gate 312 may also be enabled by the output of AND gate 318 which in turn is enabled by an F84 pulse and an F65 pulse. OR gate 314, which is coupled to the K input of flip-flop 310, is enabled by the output of OR gate 320 or the output of OR gate 322, where OR gate 320 is enabled by an F62 pulse and an $\overline{F84}$ pulse, and AND gate 322 is enabled by an F65 pulse and an F84 pulse. Flip-flop 324 has its J and K input enabled by the output of OR gate 326, where OR gate 326 is enabled by the output of AND gate 328 or the output of AND gate 330. AND gate 328 is enabled by an F63 pulse and an $\overline{F84}$ pulse, while AND gate 330 is enabled by an F84 pulse, an F65 pulse and an F66 pulse. Thus the scaling register is set by the marker register to reflect the condition thereof to interpolator 72 as shown in FIG. 2 and the second interpolator as shown in FIG. 3.

Figure 6:
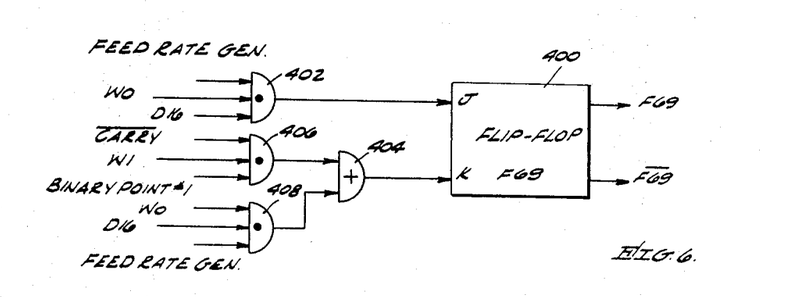

With reference now to FIG. 6, there is shown a flip-flop 400 which provides the F69 pulse on a pair of output circuits designated F69 and $\overline{F69}$. This is the particular flip-flop which provided the F69 pulse to the various gates shown in FIG. 3 as previously explained. The J input to flip-flop 400 is enabled by the output of AND gate 402, wherein AND gate 402 is enabled by W0 which indicates that an even word is present from the buffer register 16 and a FEED RATE GEN from the feed rate generator 20 as shown in FIG. 1 and also a D16 term which indicates the sixteenth digit time of the word in digit counter 120.

The K input flip-flop 400 is enabled by an OR gate 404 wherein OR gate 404 is enabled by the output pulse of AND gate 406 or the output of AND gate 408. AND gate 406 is enabled by a $\overline{CARRY}$ which indicates that no overflow is provided from AND gate 113, FIG. 3. A W1 which indicates that an even word time is provided from the buffer storage register 16 and a BINARY POINT 01 which equals the overflow point in the output number of the adder 110. AND gate 408 is enabled by W0 which indicates that an even word time is provided by the buffer storage register 16, a D16 which indicates that the sixteenth digit time of any word is present, and a $\overline{FEED\ RATE\ GEN}$ pulse which emanates from feed rate generator 20.

Figure 7:
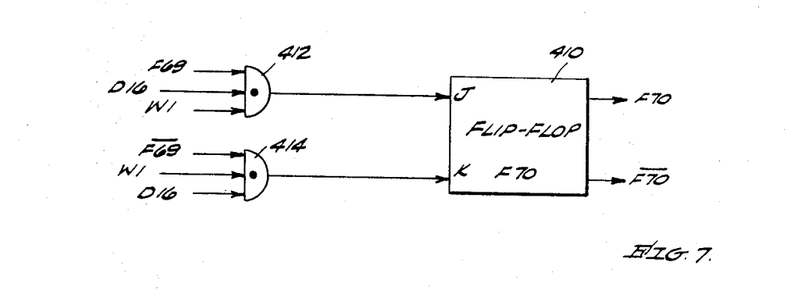

Flip-flop 410 as shown in FIG. 7 provides the pulse F70 to the various inputs as previously described in connection to FIGS. 2 and 3 and provides the output pulses F70 and $\overline{F70}$ respectively. The J input to flip-flop 410 is provided by the output of AND gate 412 and is enabled by an F69 pulse as shown in FIG. 7, a D16 and a W1. The K input to flip-flop 410 is enabled by the output of an AND gate 414 and is enabled by an $\overline{F69}$, a W1 and a D16.

Figure 8:
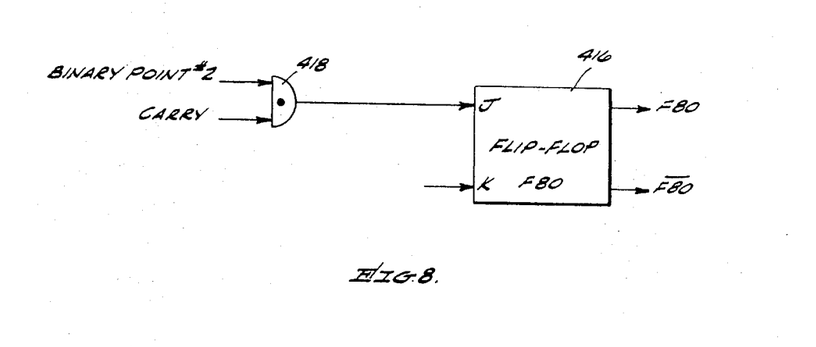

Referring now to FIG. 8, there is shown the flip-flop 416 which provides the two output pulses F80 and $\overline{F80}$. The J input to flip-flop 416 is enabled by the output of AND gate 418. AND gate 418 is enabled by a BINARY POINT 02 and a CARRY which indicates the output overflow of the adders used in the integrators as previously explained. The K input to flip-flop 416 is enabled by a D6.

BINARY POINT GENERATORS

Figure 9:
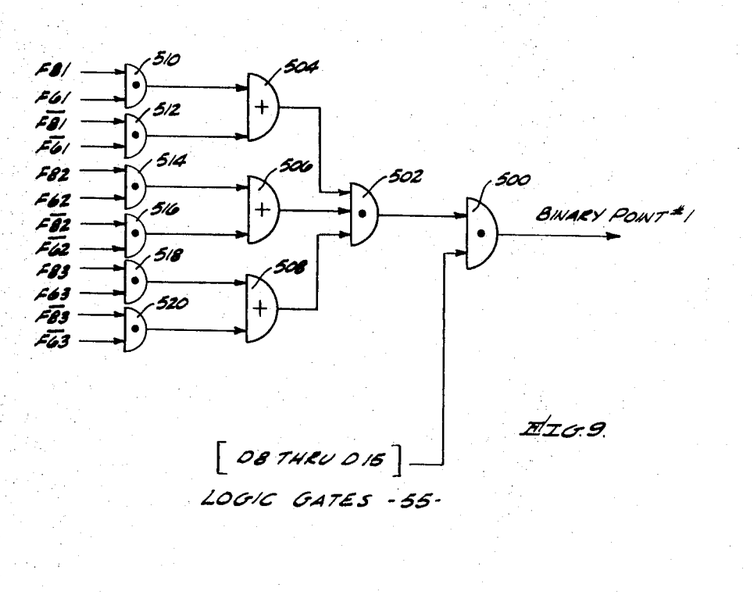
Figure 10:
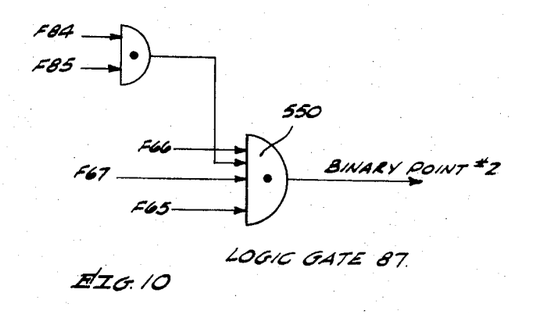

With reference now to FIG. 9, there is shown a logic block diagram of logic gate 55 of FIG. 9 which generates the BINARY POINT 01 pulse for F69 flip-flop 400. The logic diagram comprises an AND gate 500 which is enabled by the output of an AND gate 502 and the output words D8—D15 which emanate from the digit counter 120 and as shown with reference to FIG. 3a, indicated by the F84 pulse thereof. Thus, the only time a BINARY POINT 01 is produced is during the time when the word length in the digit counter is at least 8 or above. AND gate 502 is enabled by the output of an OR gate 504, 506 and 508, wherein OR gate 504 is enabled by the output of AND gate 510 and of 512, where AND gate 510 is enabled by an F81 pulse and an F86 pulse and AND gate 512 is enabled by an $\overline{F81}$ pulse and an $\overline{F61}$ pulse. OR gate 506 is enabled by the output of AND gate 514 and 516, wherein AND gate 514 is enabled by an F82 pulse and an F62 pulse and AND gate 516 is enabled by an $\overline{F82}$ and an $\overline{F62}$. And finally, OR gate 508 is enabled by the output of pulses of AND gate 518 and 520, wherein AND gate 518 is enabled by an F83 pulse and an F63 pulse, and AND gate 520 is enabled by an $\overline{F83}$ pulse and an $\overline{F63}$ pulse. Thus the only time that BINARY POINT 01 is generated is when the capacity of the digit counter exceeds 8 or at specified matching times of the digit counter and the marker register 126 time. For generation of BINARY POINT 02, reference is made to FIG. 10 wherein AND gate 550 is shown which is enabled by an F66, an F67 and F65 which indicates that the scaling counter 132 has been preset by marker generator 57 or 126 being at full scale. Also, AND gate 550 is enabled by the output of an AND gate 552 which is enabled by an F84 pulse and an F85 pulse.

At the outset, the f word, which is indicative of the feed rate number (FRN) and the distance-to-go word which in this particular case may be the Z word, is shifted into the buffer register 16 from a numerical tape source 12 as shown in FIG. 1, or the like. On certain command times, most significant digits of the f word are placed into the marker register 57 at certain word times W0 or W1 as dictated by the flip-flop 61 as shown in FIG. 2. Digit counter 58 is free running and dictated by clock 45 in synchronism with the buffer register 16. The last three digits which are indicative of the most significant bit of the f word end up in the marker register 57 and in the respective flip-flops as the pulse F61—F63. The contents of the marker register bit generate a BINARY POINT 01 in logic gates 55 which gates AND gate 52 at a predetermined time as compared to the word contained in the digit counter 58.

The position of the most significant bit in any of its 3 bit times determines the gating of AND gate 52 to enable the adder 82, depending on the setting of flip-flops 53 and 56, and accordingly adjusts the time that the adder 82 performs integration functions. AND gate 57a is enabled by pulse output D16 from digit counter 58 and the output of flip-flop 53 to assure that a start of a new word is in digit counter 58 and is also reset by flip-flop 53 and with a D16 for this same reason. Marker register 57 is coupled to the scaling register 64 to provide for parallel transfer of the number in marker register 57 into scaling register 57. By setting the marker register 57 from buffer register 16 and comparing the contents therein with the digit counter 58, an overflow will occur from AND gate 52. The inverse relationship between the two dictates the overflow from integrator 72 through the AND gate 86, thus incrementing the distance-to-go signal on a particular axis from AND gate 86 to the axis drive and to the subtractor 88 for stopping machine movement when the distance-to-go register 78 reaches zero and the movement is completed. Flip-flop 56 provides that addition only takes place during specific times dictated by AND gate 52.

Thus, each time an overflow occurs from 52, adder 82 is allowed to increment at a rate dictated by the scaling register 64 and an inverse relationship to the marker register 57. The number in the marker register 57 presets the scaling register 64 by the exact number of counts in the marker register 57 only in an opposite direction which therefore amounts to an inverse shift.

With reference to FIG. 3, the scaling register 132 provides for an overflow output multiplied by $2^n$ by shifting the contents from the marker register 126 in an opposite direction and the scaler register 132 therefore is shortened by the amount the marker register is lengthened. The output of the scaling counter is the marker word multiplied by $2^{n-1}$ and provides the precise shift and is independent of the particular length in register 112. There is then provided a shift in a direction opposite of the number in the marker register 126. Thus, if register 112 is shortened, the output of register 116 is at a faster rate but the output of adder 152 is at a slower rate.

For example, if a desired feed rate number (FRN) is first stored in buffer 16, it is desirable to adjust the overflow time from AND gate 52 which is accomplished as previously described by use of the marker register 57, the digit counter 58, and the logic gate 55. The contents is shifted serially from buffer register 16 to marker register 57. Because the marker register is only comprised of three flip-flops, 200, 210 and 211, the contents therein only holds the most significant bit (MSB) of the *FRN*. For example, if the most significant bits comprise three binary bits, 010, the output of marker register 57 synchronized with the digit counter 58 will be enabled on the F62 pulse from flip-flop 210 as described in FIG. 9 with relation to the logic gates 55.

On the other hand, should the three most significant bits of the *FRN* be 100, the F63 pulse of flip-flop 210 of marker register 57 will be enabled in relation to digit counter 58 to enable logic gate 55 and AND gate 52 respectively. If the most significant bits, for example, are 101, the binary point would theoretically be enabled at two times on the F61 pulse and F63 pulse from flip-flops 210 and 211, but this, of course, is immaterial on the F61 pulse because it is desired that the logic gates 55 and AND gate 52 be enabled at least at this time and also when F63 pulse is present. If the number in the marker register 57 is 001 the binary point would be triggered on the least of the three most significant digit times or the F61, F81 pulses.

Thus, the triggering of the AND gate 52 is made possible by appropriate value of the three most significant bits of the *FRN* of the buffer register 16 in relation to the enabling of the BINARY POINT 01 through use of the digit counter 58 and marker register 57.

Thus it has been shown in this embodiment apparatus which accomplishes the objects of this invention wherein a feed rate number is first detected by a digit counter and the value thereof readjusts the accumulator registers in interpolating devices so that the adders provided therein will always provide an overflow independent of the length of the word provided from buffer storage. The comparison between the digit counter word and the buffer word is relayed to marker registers and other counting logic for readjustment of the binary point of the output word. Also, there is provided a method of storing the distance to move into an incremental subtractor and a distance-to-go register as shown in FIG. 3, for example, as distance-to-go registers 138 and 178, wherein as each of the words have been interpolated from the buffer registers through their various interpolators and provided machine axes movements to the machine tool, the distance-to-go counters are subtracted incrementally and when the contents of the distance-to-go registers 138 and 178, for example, reaches zero, stop command signals are presented to the machine axis to stop the movement thereof.

Having thus explained preferred embodiments of this invention, what I claim is:

1. An electrical control system including servo means for relatively positioning a pair of relatively movable members comprising:

input means for receiving input information, the information including a feed rate word;

an interpolator providing output signals in response to input information provided by said input means, said interpolator including an adder and an accumulator capable of holding interpolator function words; and circuit means coupled to said interpolator and being responsive to said input means for modifying the overflow time for the adder and thereby, the value of the interpolator function words inversely proportional to the value of the feed rate word.

2. The control system as defined in claim 1 wherein said circuit means includes register means responsive to said feed rate word for registering the value thereof and means for scaling the function words relative to the feed rate word coupled to said interpolator.

3. The control system as defined in claim 2, wherein said circuit means includes logic circuitry responsive to the contents of said registering means and the feed rate word for readjusting the value of digital pulses which are supplied by said interpolator.

4. The control system as defined in claim 1 wherein:

said interpolator further includes an integrand register coupled to said adder;

said circuit means includes means responsive to said feed rate word for registering the value thereof; and means for scaling the function word from the accumulator register relative to the value of the word entered into the integrand register.

5. A digital computing apparatus comprising:

a first means for storing digital information of a predetermined word length;

a second means for storing digital information of a changeable word length;

adding means for serially adding the contents stored in said first means to the contents of said second means and having an output circuit coupled to said second means for returning the summation thereof to said second means; and logical circuit means for varying the overflow time in the output circuit of said adding means and thereby, the word length value of said second means, said logical circuit means being responsive to the digital weight of the digital word of information stored in said first means.

6. The apparatus as defined in claim 5, said logical circuit means comprising gating means coupled to the output circuit of said adding means for supplying output increments when the storage of said second means reaches an overflow capacity.

7. The apparatus as defined in claim 5, said logical circuit means comprising:

a register, said register having an input circuit being coupled to said first means and being capable of registering the weight of the digital input word, said register having an output circuit being coupled to said adding means for varying overflow time of the adding means and thereby the capacity of said second means; and gating means, coupled to the output of said adding means, for supplying output increments when the accumulations in said second means reaches an overflow capacity and further being responsive to a predetermined condition of said digital counter.

8. The apparatus as defined in claim 5 wherein:

said first means includes an integrand register having an input circuit being capable of receiving a digital integrand word and an output circuit;

said second means includes an accumulation register having an input circuit being capable of receiving the summation of said adding means; and said logical circuit means comprising a register, said latter register having an input circuit being coupled to the input circuit of the integrand register of said first means and being capable of registering the weight of the digital input word, said latter register having an output circuit being coupled to the output circuit of said adding means for varying the overflow time of the adding means and thereby the capacity of said second means.

9. The apparatus as defined in claim 5 wherein said first means includes an integrand register, said integrand register having an input circuit being capable of receiving a digital integrand word and an output circuit, the output circuit being coupled to said adding means, and said second means including an accumulator register, said accumulator register having an input circuit being capable of receiving the summation of said adding means, said logical circuit means comprising:

a marker register capable of registering the weight of the digital input word received by the integrand register of said first means, said marker register having an input circuit coupled to the input circuit of the integrand register of said first means.

10. The apparatus as defined in claim 5 wherein said first means includes an integrand register, said integrand register having an input circuit being capable of receiving a digital integrand word and an output circuit, the output circuit being coupled to said adding means, and said second means including an accumulator register, said accumulator register having an input circuit being capable of receiving the summation of said adding means, said logical circuit means comprising:

a digital counter and marker register, said marker register being capable of registering the weight of the digital input word received by the integrand register of said first means, said marker register having an input circuit coupled to the input circuit of the integrand register of said first means and having an output circuit; and gating means coupled to the output circuit of said adding means for supplying output increments when the accumulations in the accumulator register of said second means reaches an overflow capacity, said gating means being further responsive to a predetermined condition of said digital counter.

11. A digital computing integrator comprising:

an integrand register, said integrand register having an input circuit for receiving digital data words of a predetermined word length and an output circuit;

a serial adder, said serial adder having a first input circuit, a second input circuit and an output circuit, the first input circuit of said serial adder being coupled to the output circuit of said integrand register;

an accumulator register, said accumulator register having an input circuit and an output circuit, the input circuit of said accumulator register being coupled to the output circuit of said serial adder and the output circuit of said accumulator register being coupled to the second input circuit of said serial adder, said accumulator register having a variable word length capacity; and logical means coupled to the output circuit of said adder for varying the overflow time at the output circuit of the adder and thereby the capacity of said accumulator register, said means being coupled to said accumulator register and being responsive to the length of the word to be stored in said integrand register.

12. The integrator as defined in claim 11 wherein said logical means comprises a marker register and a digital counter, said marker register having an input circuit and an output circuit, the input circuit of said marker register being coupled to the input of said integrand register and the output of said marker register being coupled to said adder for varying the overflow time in the output of said adder and thereby the capacity of said accumulator register.

13. The integrator as defined in claim 11, said logical means comprising gating mean coupled to the output circuit of said adder and being responsive to predetermined conditions of the input word and overflow increments from said accumulator.

14. The integrator as defined in claim 11, wherein said logical means comprises:

means including a digital counter, said latter means having an input circuit being coupled to the input circuit of said integrand register and being responsive to register weight of the digital data words thereof, and an output circuit being coupled to said logical means for varying the overflow time and thereby the capacity of said accumulator register; and gating means coupled to the output circuit of said adder and being responsive to predetermined conditions of said digital counter for gating overflow increments in the output circuit of the adder.

15. In a control system having servo means for relatively positioning a pair of relatively movable members comprising:

input means for receiving at least a pair of digital words, one of which includes a feed rate number;

a digital integrator, said integrator including: an integrand register, said integrand register having an input circuit coupled to said input means and an output circuit, an accumulator, said accumulator having an input circuit and an output circuit and an adder, said adder having a pair of input circuits and an output circuit, one of the pair of adder input circuits being coupled to the output circuit of the integrand register and the other adder input circuit being coupled to the output circuit of the accumulator register, the output circuit of the adder being coupled to the input circuit of the accumulator register, said integrator being coupled to receive the digital words on the input of integrand register;

logical means coupled to the integrand input circuit of said integrator for determining the value of the feed rate number; and gating means responsive to said means for determining the value of the feed rate number for gating overflow in the output of the adder and thereby adjusting the accumulator capacity of said integrator inversely proportional to the value of the feed rate number.

16. In a machine tool control system for use in contour cutting employing first and second digital integrators to perform interpolation functions to control machine axes;

a buffer register capable of holding a plurality of words for imparting machine tool axes movement and including a feed rate number to determine the rate of feed in which the machine tool moves;

a free-running digit counter operating in synchronism with said buffer storage;

a marker register for storing the most significant bit of the feed rate number from said buffer storage and being incremented in synchronism with said digital counter;

first control logic means coupled to said marker register and said interpolator for determining the interpolation overflow therefrom;

a scaling register for controlling interpolation overflow inversely proportional to said marker register for incrementing the second interpolator in said system; and second control logic means coupled to said interpolators to cause incrementations therefrom at predetermined times depending upon the axis word from said buffer storage.

17. The system as defined in claim 16 and further comprising:
a distance-to-go register, said distance-to-go register being coupled to said buffer register and capable of receiving the appropriate axes movement number therein; and
said second control logic means coupled to said distance-to-go register and being incremented by the interpolators of said system for incrementally subtracting the value of the axes movement in said distance-to-go counter in relation to the interpolator function.

18. The system as defined in claim 16 and further comprising:
command pulse generators; and
logic means coupled to said buffer storage register and being responsive to said command pulse generators for transferring the data in said buffer storage to said distance-to-go register at predetermined times.

19. The system as defined in claim 16 and further comprising; logic means coupled to said digit counter and said marker register for enabling the control logic to enable a predetermined interpolator of said system.

20. The machine tool control system as defined in claim 17 and further including; logic gating means coupled to said buffer register for gating preselected buffer words to a selected interpolator.

21. The system as defined in claim 17 and further comprising:
a distance-to-go register, said distance-to-go register being coupled to said buffer register and capable of receiving the appropriate axes movement number therein;
logic means coupled to said distance-to-go register and being incremented by the interpolators of said system for incrementally subtracting the value of the axes movement in said distance-to-go counter in relation to the interpolator function; and
logic gating means coupled to said buffer register for gating preselected buffer words to a selected interpolator.

22. The system as defined in claim 17 and further comprising:
command pulse generators;
a first logic means coupled to said buffer storage register and being responsive to said command pulse generators for transferring the date in said buffer storage to said distance-to-go register at predetermined times; and
a second logic means coupled to said digit counter and said marker register for enabling said control logic to enable a predetermined interpolator of said system.

23. An electrical system having servo means for relatively positioning a pair of relatively movable members, comprising:
discrete signal program means for producing feed rate signals and for producing distance-to-go signals;
first integrator means having an output and having an input for receiving said feed rate signals;
second integrator means having an output and having an input for receiving said distance-to-go signals, said second integrator means being controlled by said first integrator means to cause distance-to-go signals to be produced at the output of said second integrator means for controlling said servo means; and
circuit means having an input for receiving said feed rate signals, and having output circuits coupled to both of said integrator means, said circuit means being responsive to said feed rate signals for increasing the frequency of signals at the output of one of said integrator means while decreasing the frequency of signals at the output of the other integrator means.

24. The electrical system according to claim 23 in which said circuit means comprises:
register means including a feed rate register for receiving said feed rate signals;
a counter driven at a constant pulse rate; and
means for comparing the output of said counter with the output of said feed rate register means for controlling the frequency of output of said first integrator means.

25. The electrical system according to claim 24 in which said register means includes additionally:
a scaling register responsive to said feed rate register; and
means for comparing the output of said counter with the output of said scaling register for controlling the frequency of output of said second integrator means.

26. The electrical system according to claim 23 in which said first integrator means and said second integrator means each comprise:
an integrand register for receiving either said feed rate signals or said distance-to-go signals;
an accumulator register; and
an adder coupled to said integrand register and to said accumulator register for adding the contents of said integrand register to the contents of said accumulator register.

27. The electrical system according to claim 26, including:
variable frequency generator means coupled to said adder of said first integrator means for controlling the rate in said first integrator means at which the contents of said integrand register are combined with the contents of said accumulator register; and
a switching circuit coupling the output of said first integrator means to said adder of said second integrating means for controlling the rate in said second integrator means at which the contents of said integrand register are combined with the contents of said accumulator register.

28. The electrical system according to claim 27, including:
a distance-to-go register for receiving said distance-to-go signals; and
means coupled to the output of said second integrator means and coupled to said distance-to-go register for generating a stop signal when the output of said second integrator bears a predetermined relationship to the distance-to-go.